(12) United States Patent
Nappi

(10) Patent No.: US 12,114,691 B2
(45) Date of Patent: Oct. 15, 2024

(54) SMOKING ARTICLE WITH COLOUR SHIFTING MARKING

(71) Applicant: Philip Morris Products, S.A., Neuchatel (CH)

(72) Inventor: Leonardo Nappi, Hauterive (CH)

(73) Assignee: PHILIP MORRIS PRODUCTS S.A., Neuchâtel (CH)

( * ) Notice: Subject to any disclaimer, the term of this patent is extended or adjusted under 35 U.S.C. 154(b) by 568 days.

(21) Appl. No.: 14/769,902

(22) PCT Filed: Feb. 24, 2014

(86) PCT No.: PCT/IB2014/059214
§ 371 (c)(1),
(2) Date: Aug. 24, 2015

(87) PCT Pub. No.: WO2014/132180
PCT Pub. Date: Sep. 4, 2014

(65) Prior Publication Data
US 2016/0007647 A1 Jan. 14, 2016

Related U.S. Application Data

(60) Provisional application No. 61/770,001, filed on Feb. 27, 2013.

(30) Foreign Application Priority Data

Feb. 27, 2013 (EP) .................................... 13157079

(51) Int. Cl.
*A24D 1/02* (2006.01)
*A24C 5/60* (2006.01)
(Continued)

(52) U.S. Cl.
CPC ................ *A24D 1/025* (2013.01); *A24C 5/60* (2013.01); *A24C 5/601* (2013.01); *A24D 1/02* (2013.01); *A24D 3/04* (2013.01); *C09C 1/0015* (2013.01)

(58) Field of Classification Search
None
See application file for complete search history.

(56) References Cited

U.S. PATENT DOCUMENTS 4,854,332 A   8/1989  Hanakura
5,135,812 A   8/1992  Phillips et al.
(Continued)

FOREIGN PATENT DOCUMENTS

CN   2567712 Y   8/2003
CN   1637078 A   7/2005
(Continued)

OTHER PUBLICATIONS

Picture of individual cigarettes in a pack of cigarette with "brand", 1980.*
(Continued)

*Primary Examiner* — Phu H Nguyen
(74) *Attorney, Agent, or Firm* — Mueting Raasch Group

(57) ABSTRACT

Smoking articles include a colour shifting marking. The marking may be provided on a wrapper, such as a plug wrap, a smokable material wrap, or a tipping paper wrap. The marking may be produced by a gonichromatic pigment to provide a smooth transition between colours as viewing angles change. The marking may allow a consumer to identify the smoking article as genuine, as opposed to counterfeit.

11 Claims, 3 Drawing Sheets

(51) Int. Cl.
*A24D 3/04* (2006.01)
*C09C 1/00* (2006.01)

(56) References Cited

U.S. PATENT DOCUMENTS

| | | | |
|---|---|---|---|
| 6,193,794 B1 | 2/2001 | Schmid et al. | |
| 6,214,766 B1* | 4/2001 | Kurrle | B41M 3/142 |
| | | | 503/201 |
| 6,472,455 B1* | 10/2002 | Bleikolm | C09C 1/0081 |
| | | | 523/160 |
| 2005/0076927 A1* | 4/2005 | Schluter | A24D 3/043 |
| | | | 131/339 |
| 2005/0132929 A1 | 6/2005 | Raksha et al. | |
| 2006/0180049 A1 | 8/2006 | Fuller et al. | |
| 2007/0139744 A1 | 6/2007 | Argoitia et al. | |
| 2007/0190298 A1 | 8/2007 | Hampden-Smith et al. | |
| 2010/0072739 A1 | 3/2010 | Kuntz et al. | |
| 2010/0219626 A1 | 9/2010 | Dietemann | |
| 2010/0295287 A1* | 11/2010 | Reichert | C09B 67/009 |
| | | | 283/70 |
| 2012/0021851 A1 | 1/2012 | Hogge | |

FOREIGN PATENT DOCUMENTS

| | | |
|---|---|---|
| CN | 1982086 A | 6/2007 |
| CN | 101102905 A | 1/2008 |
| CN | 102649889 A | 8/2012 |
| EP | 0 785 238 A1 | 7/1997 |
| EP | 1489151 A1 | 12/2004 |
| EP | 1544255 A2 | 6/2005 |
| EP | 2207854 B1 | 1/2012 |
| EP | 2465701 A2 | 6/2012 |
| FR | 2763080 A1 | 11/1998 |
| GB | 294492 A | 2/1929 |
| JP | H11-315219 A | 11/1999 |
| JP | 2009-149043 A | 7/2009 |
| JP | 2012-507287 A | 3/2012 |
| WO | WO 2006/076616 A2 | 7/2006 |
| WO | WO 2006/133512 A1 | 12/2006 |
| WO | WO 2009/053391 A2 | 4/2009 |
| WO | WO 2010/051076 A1 | 5/2010 |
| WO | WO 2011/042354 A1 | 4/2011 |

OTHER PUBLICATIONS

Mathias ("I Love 'Loosies': In Defense of Black Market Cigarettes"); https://www.huffpost.com/entry/i-love-loosies-in-defense_b_845698#:~:text=Loosies%20are%20a%20particularly%20decadent,to%20commit%20to%20a%20pack. published Apr. 6, 2011.*
Office Action from corresponding Japanese Patent Application No. 2015-559583, dated Aug. 8, 2018, including English translation of the office action, 6 pgs.
Office Action and Search Report from corresponding Russian Patent Application No. 2015141068, issued on Jan. 12, 2018, including English translation of the office action, 8 pgs.
Office Action from corresponding Chinese Patent Application No. 201480010076.0, issued on May 22, 2018, including English translation of the office action, 15 pgs.
International Search Report and Written Opinion for PCT/IB2014/059214, issued by the European Patent Office, dated Jul. 29, 2014.
Extended European Search Report for EP 13157079.8, issued by the European Patent Office, dated Aug. 30, 2013; 4 pgs.
International Preliminary Report on Patentability received in PCT/IB2014/059214, issued by The International Bureau of WIPO on Sep. 11, 2015; 7 pgs.
"Color Card for Print and Plastic Applications—effect pigments®" Merck KGaA PM Pigments, Darmstadt, Germany; Aug. 2011:16 pgs.
"Colorstream®" Merck KGaA, Darmstadt, Germany, excerpt from the Internet, Mar. 14, 2017: [online] http://www.merck-performance-materials.com/en/plastics/printing_and_plastics_colostream/printing_and_plastics_colorstream.html: 1 pg.
"Firemist®", BASF, Germany, Copyright 2014, excerpt from the Internet, Mar. 14, 2017: [online] http://product-finder.basf.com/group/corporate/products-finder/en/brand/FIREMIST; 2 pgs.
"ChromaFlair" Wikipedia, excerpt from the Internet, Mar. 14, 2017: 1 pg.

* cited by examiner

SMOKING ARTICLE WITH COLOUR SHIFTING MARKING

This application is the § 371 U.S. National Stage of International Application No. PCT/IB2014/059214, filed 24 Feb. 2014, which claims the benefit of U.S. Provisional Application No. 61/770,001, filed 27 Feb. 2013, and European Application No. 13157079.8, filed 27 Feb. 2013, which are incorporated by reference herein in their entireties.

This disclosure relates to smoking articles having a visible colour shifting marking.

Combustible smoking articles, such as cigarettes, typically have shredded tobacco surrounded by a paper wrapper forming a tobacco rod. A cigarette is employed by a smoker by lighting one end of the cigarette and burning the shredded tobacco rod. The smoker then receives mainstream smoke into their mouth by drawing on the opposite end or mouth end of the cigarette, which typically contains a filter. The shredded tobacco can be a single type of tobacco or a blend of two or more types of tobacco depending on the brand of cigarette.

Other known smoking articles include, for example, smoking articles in which an aerosol is generated by electrical heating or by the transfer of heat from a combustible fuel element or heat source to an aerosol generating substrate. During smoking, volatile compounds are released from the aerosol generating substrate by heat transfer from the heat source and entrained in air drawn through the smoking article. As the released compounds cool they condense to form an aerosol that is inhaled by the consumer. Also known are smoking articles in which a nicotine-containing aerosol is generated from a tobacco material, tobacco extract, or other nicotine source, without combustion, and in some cases without heating, for example through a chemical reaction.

Various portions of smoking articles may contain a wrapper or housing that is visible to a consumer. For example, the filter rod of a cigarette is typically wrapped with plug wrap paper, tobacco rods are typically wrapped with cigarette paper, and the tobacco rod and filter rod are typically attached with tipping paper. Non-combustible smoking articles may have similar wrappers or housings to contain components of the smoking article. Portions of the plug wrap, cigarette paper, tipping paper, other wrappers or housings of smoking articles may be visible to a consumer.

The housings or wrappers are typically plain white or coloured. Sometimes an indicia, such as an image, logo or text, is printed on one or more of these wrappers so that a user may readily recognize and identify a product as genuine. Even with such measures, the volume of counterfeit smoking articles continues to increase.

Other mechanisms have been developed to allow a user to more readily distinguish genuine products from counterfeit products. For example, smoking articles marked with colour shifting portions, where the colour shifts depending on the viewing angle, have been proposed. The colour shifting is achieved by aligning printing and embossing features. However, such printing, embossing and alignment can be difficult from an operational perspective and can produce indicia that do not shift colour in a continuous or smooth manner.

One object of this disclosure is to describe a smoking article that produces a novel visual effect. The novel visual effect may allow a user to more readily identify the smoking article as genuine. In embodiments, the novel visual effect is a colour shifting marking that shifts colours in a smooth and continuous manner. As used herein, "colour shifting" means that the colour of an object or marking shifts depending on the viewing angle and light incidence. A marking that smoothly shifts colour may in some cases be more readily acceptable by consumers as being indicative of a genuine article than a marking that abruptly changes colours.

In a first aspect, a smoking article comprises a marking that includes a first colour shifting pigment, wherein the first colour shifting pigment produces a first colour when viewed from a first angle and produces a second colour when viewed from a second angle. This can allow a smooth transition from the first colour to the second colour as the viewing angle changes from the first angle to the second angle.

Any suitable smoking article or wrapper or housing for a smoking article may include a marking described herein. The term "smoking article" includes cigarettes, cigars, cigarillos and other articles in which a smokable material, such as a tobacco, is lit and combusted to produce smoke. The term "smoking article" also includes articles in which smokable material is not combusted, such as but not limited to smoking articles that heat a smoking composition directly or indirectly, or smoking articles that neither combust nor heat the smoking composition, but rather use air flow or a chemical reaction to deliver nicotine or other materials from the smokable material.

Typically, a smoking article is in a form that allows for a user to grasp the article and inhale smoke, if desired. Smoking articles include a smokable composition and often include a filter disposed downstream of the smoking composition to filter constituents released from the smoking composition. A smoking article typically has outer wrappers or other elements such as a housing that is visible to a consumer. The housing may contain the smokable composition or a filter.

The marking may be provided on, or incorporated in, a wrapper, a housing or any other component of the smoking article visible to the consumer. Regardless on which component of a smoking article the marking is provided, the marking is provided on a visible area of the smoking article. It will be understood that a "visible area" is an area of the article visible to a user. Preferably, the marking is provided on an exterior surface. Of course, the marking may be provided on a surface other than an exterior surface. For example, if one or more exterior layers, or portions thereof, of the smoking article are transparent or semi-transparent or include a window, underlying layers, or portions thereof, may be visible from the exterior of the fully assembled article. Thus, underlying layers or portions thereof, in some embodiments, may provide visible areas. For the purposes of this disclosure, the term "transparent" is used herein to describe a material which allows at least a sufficient proportion of incident light to pass through it so that it is possible to see through the material.

In embodiments, the component on which the marking is provided is a wrapper, such as a plug wrap, cigarette paper, a tipping paper, or other suitable wrapper of a smoking article. Typically, a wrapper of a smoking article is formed from paper or other material, such as cellulosic based materials. In other embodiments, the wrapper is a film, such as a cellulosic film or other film such as a polylactic acid film. The film may be substantially or entirely transparent.

If the marking is provided on a transparent or semi-transparent component or portion of the smoking article, the marking may be provided on the inner surface of the transparent or semi-transparent component or portion as the marking will be exteriorly visible through the transparent component or portion, such as a transparent film wrapper. The marking may also be provided on or incorporated into a component underlying a transparent component or portion.

In any case, the marking is provided on or in the smoking article or on or in a component of the smoking article such that the marking is visible to a consumer of the smoking article.

Any suitable colour shifting marking may be provided on or in the smoking article or a component of the smoking article. In embodiments, the colour shifting marking is visible over an entire surface of the smoking article. Accordingly, the colour of the entire surface of the article will shift from a first colour when viewed from a first angle to a second colour when viewed from a second angle. In embodiments, the colour shifting marking covers a portion of a surface of the smoking article or component.

Preferably, the marking forms all or part of an indicia. As used herein, "indicia" refers to a discrete visual element or relating element or pattern. The indicia may be in the form of a logo, text, image, pattern, or the like, or combinations thereof. By way of example, the indicia may comprise a brand or manufacturer logo that allows a consumer to identify the type or origin of the smoking article. The indicia may be aligned with the longitudinal axis of the smoking article, generally perpendicular to the longitudinal axis of the smoking article, or at any other angle other than parallel or perpendicular to the longitudinal axis of the smoking article.

It will be understood that the colour shifting marking, when incorporated into a smoking article, and in particular, when incorporated into a curved surface of a smoking article, may have different visual effects than when incorporated on or in a flat component. For example, when incorporated on or in an article having a flat surface, the angle at which the marking is viewed will be substantially similar across the entire marking. However, when incorporated in or on a curved surface, different portions of the marking may be viewed from different angles relative to flat surface. For example, if a single colour shifting ink or pigment is used to generate the colour shifting marking, the entire marking may appear to be one colour when the marking is present on a flat surface and is viewed from a given angle. However, when viewed on a curved surface, the marking may appear to be of two or more colours when viewed from a given point of view due to different viewing angles of different portions of the marking along the curved surface. The marking may also shift through a number of colours if placed around a cylindrical smoking article as the article is rotated.

Any suitable colour shifting pigment may be used to produce the marking or a portion thereof. By way of example, a colour shifting pigment may be a goniochromatic pigment.

As used herein, "goniochromatic pigment" is a pigment that produces colours that vary depending on the viewing angle and light incidence. Goniochromatic pigments typically impart iridescent effects in somewhat the same way as a pearlescent product. Goniochromatic pigments may produce two or more colours depending on the viewing angle. Goniochromatic pigments may be formed as multi-layered flakes. Typically the multilayered flakes include a middle transparent layer that separates adsorbing or reflective layers. The transparent layer may be an artificial substrate or a natural substrate. Artificial layers tend to provide higher quality because they tend to be uncoloured and have smooth surfaces. Preferably, the artificial layer is formed from borosilicate. Several goniochromatic pigments that may be used are commercially available. For example, commercially available goniochromatic pigments include Merck's Colorstream™ pigments BASF's Firemist™ pigments. Colour shifting pigment flakes are also produced by JDS Uniphase (USA) and HUE (China).

The colour shifting pigment may be placed on a visible surface of a smoking article, or a component of a smoking article that is visible when incorporated into the smoking article, in any suitable manner. In embodiments, the colour shifting pigment is present in an ink that is printed on the surface of the smoking article or the component of the smoking article. Any suitable printing process may be used to print the ink on the surface of the smoking article or component. For example, gravure printing or spray printing, such as ink or laserjet printing, may be used.

An ink that contains a colour shifting pigment may be formulated in any suitable manner depending on the printing method used. In embodiments, an ink includes a solvent, a colour shifting pigment, and a binder. The ink may further include a dispersant. A "colour shifting ink", as used herein, includes an optically variable ink, as generally known in the art.

The ink may include any suitable solvent. For example, the solvent may be an aqueous solvent or an organic solvent. Examples of solvents that may be used include water, propylene glycol, propyl alcohol, toluene, glycol-ethers or the like, or combinations thereof. The solvent may be included in the ink in any suitable amount. For example, the ink may comprise about 50% or more solvent by weight. The ink may include about 90% or less solvent by weight. In embodiments, the ink includes from about 50% by weight solvent and about 90% by weight solvent The ink may include any suitable colour shifting pigment, such as a goniochromatic pigment, as described above, which may be included in the ink in any suitable amount. For example, the ink may comprise about 1% or more pigment by weight. The ink may include about 30% or less pigment by weight. In embodiments, the ink includes from about 1% by weight pigment and about 30% by weight pigment.

The ink may include any suitable binder. For example, the binder may be a cellulosic binder, such as ethylcellulose, nitrocellulose, sodium carboxymethylcellulose, a cellulose gum, or the like, or combinations thereof. The binder may be included in the ink in any suitable amount. For example, the ink may comprise about 2% or more binder by weight. The ink may include about 15% or less binder by weight. In embodiments, the ink includes from about 2% by weight binder and about 15% by weight binder.

The ink may include any suitable dispersant. For example, the dispersant may be lecithin, or the like. The dispersant may be included in the ink in any suitable amount. Preferably, the ink includes about 4% or less dispersant by weight. For example, the ink may include from about 0.001% by weight dispersant and about 4% by weight dispersant, or the ink may comprise about 0.001% or more dispersant by weight.

Preferably, the smoking article or a component of the smoking article, such as a wrapper, includes a first region adjacent at least a portion of the colour shifting marking. In some preferred embodiments, the first adjacent region is coloured such that a colour of the colour shifting pigment blends with the colour of the first adjacent region when viewed from a particular angle. For example, the first adjacent region can be coloured such that the first colour of the first colour shifting pigment blends with the colour of the first adjacent region when viewed from the first angle. Alternatively, first adjacent region can be coloured such that the second colour of the first colour shifting pigment blends with the colour of the first adjacent region when viewed from the second angle. This can produce a blended colour marking that is different from the colour of the adjacent region and the colour of the colour shifting marking. For example, if the colour shifting marking produces a blue colour when viewed from a particular angle, the blue colour will appear green or more green if the adjacent colour is yellow.

In some other preferred embodiments, the first adjacent region is coloured the same colour as a colour produced by the first colour shifting pigment when viewed from a particular angle. For example, the first adjacent region can be coloured the same colour as the first colour produced by the first colour shifting pigment when viewed from the first angle, or the second colour produced by the first colour shifting pigment when viewed from the second angle.

In some embodiments, the smoking article or a component of the smoking article, such as a wrapper, can include a second region adjacent at least a portion of the colour shifting marking. The second adjacent region can be coloured such that a colour of the colour shifting pigment blends with the colour of the second adjacent region when viewed from a particular angle. For example, the second adjacent region can be coloured such that the first colour of the first colour shifting pigment blends with the colour of the second adjacent region when viewed from the first angle. Alternatively, second adjacent region can be coloured such that the second colour of the first colour shifting pigment blends with the colour of the second adjacent region when viewed from the second angle. This can produce a blended colour marking that is different from the colour of the second adjacent region and the colour of the colour shifting marking. For example, if the colour shifting marking produces a blue colour when viewed from a particular angle, the blue colour will appear green or more green if the adjacent colour is yellow.

In some embodiments, the second adjacent region can be coloured the same colour as a colour produced by the first colour shifting pigment when viewed from a particular angle. For example, the second adjacent region can be coloured the same colour as the first colour produced by the first colour shifting pigment or the second colour produced by the first colour shifting pigment.

As used herein, "same colour" means that the colours are sufficiently similar that they are not discernible from one another or that the colours are sufficiently similar to each other such that a boundary between the colours is not discernible.

The adjacent region or regions having the adjacent colour or colours may be provided on or in the same component or surface as the colour shifting marking. In addition or alternatively, the adjacent colour or colours may be provided on or in a different surface or component than the surface or component on or in which the colour shifting marking is provided. If the surfaces or components are different, one or both of the adjacent colour or colours and the colour shifting marking may be provided on or in a transparent or semi-transparent component or layer or a transparent or semi-transparent portion of a component or layer.

The adjacent region or regions having the adjacent colour or colours may be provided as a background on or above which the colour shifting marking is provided. In some embodiments, the adjacent region or regions at least partially or fully surrounds the colour shifting marking. Alternatively or additionally, the colour shifting marking at least partially or fully surrounds the adjacent region or regions.

The colour of the adjacent region or regions may be colour shifting or may be non-colour shifting. For example, the adjacent region or regions may have a colour produced by a colour shifting pigment or may be formed by a non-shifting colour agent. Preferably, the adjacent colour or colours are produced by a different pigment than the colour shifting marking if the adjacent colour or colours are colour shifting.

In some embodiments, combinations of adjacent colours and colour shifting markings are used to produce an indicia in which at least one, but not all, of the colour shifting markings (or not the entire colour shifting marking) is visible when viewed from at least one viewing angle. In embodiments, when viewed from any angle, at least a portion of the colour shifting marking or at least one or multiple colour shifting markings is not visible or becomes hidden. As used herein, "hidden" means to be visually indistinguishable or substantially visually indistinguishable from an adjacent or surrounding region. For example, one portion of a marking or one of multiple markings are not visible or becomes hidden when viewed from a particular angle, but as the viewing angle changes that portion of the marking or that marking becomes visible while another portion of the marking or another marking becomes hidden.

By way of example, a colour shifting marking may include two characters, such as two letters, formed from the same colour shifting pigment. Differently coloured regions adjacent to (e.g. surrounding) each colour shifting character such that one adjacent region is essentially the same colour as the colour shifting characters when viewed from a first angle, but different from the adjacent region when viewed from a second angle. The other colour shifting character may be adjacent to a colour that is the same as the colour of the colour shifting characters when viewed from the second angle, but that is different from the colour of the colour shifting characters when viewed from the first angle. Accordingly, when viewed from the first angle, the second colour shifting character will be visible and the first colour shifting character will be hidden. However, when viewed from the second angle, the first colour shifting character will be visible and the second colour shifting character will be hidden.

All scientific and technical terms used herein have meanings commonly used in the art unless otherwise specified. The definitions provided herein are to facilitate understanding of certain terms used frequently herein.

As used herein, the singular forms "a", "an", and "the" encompass embodiments having plural referents, unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Referring now to FIGS. 1-5, schematic drawings are depicted that illustrate various aspects of smoking articles or components of smoking articles that have or may have a visible colour shifting marking. The drawings are not necessarily to scale and are presented for purposes of illustration and not limitation. The drawings depict various aspects described in this disclosure. However, it will be understood that other aspects not depicted in the drawings fall within the scope and spirit of this disclosure. Like numbers used in the figures refer to like components, steps and the like. However, it will be understood that the use of a number to refer to a component in a given figure is not intended to limit the component in another figure labelled with the same number. In addition, the use of different numbers to refer to components is not intended to indicate that the different numbered components cannot be the same or similar.

Figure 3A:
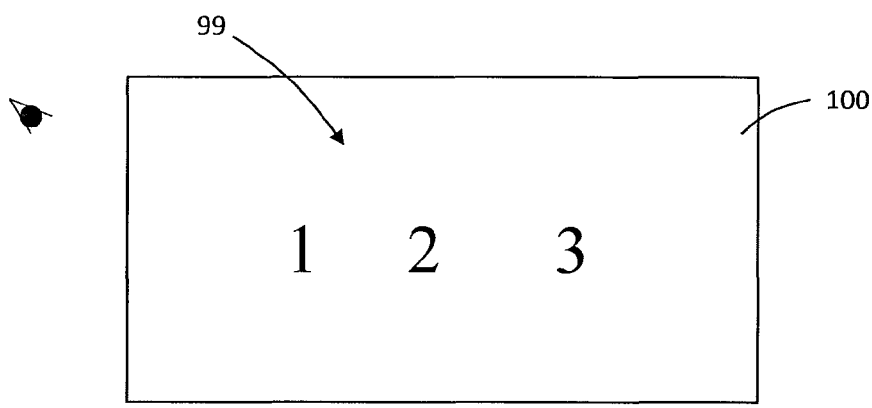
Figure 3B:
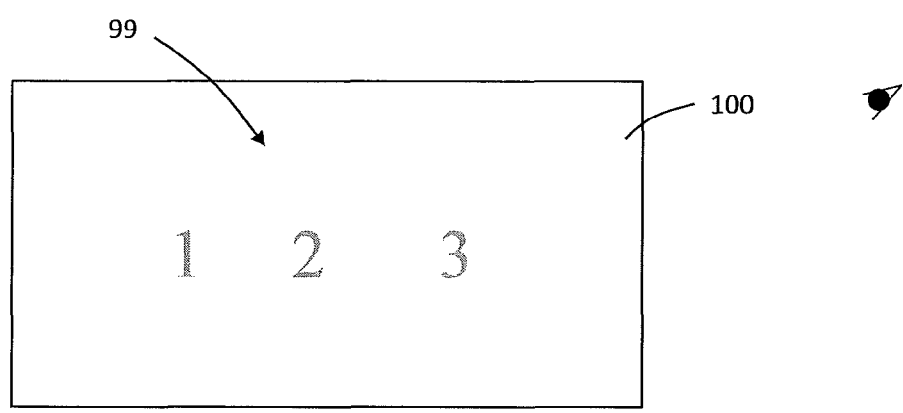

FIGS. 3A-B are schematic views of a colour shifting marking provided on a wrapper showing that the colour shifts when viewed from a first angle (A) relative to when viewed at a second angle (B).

Figure 4A:
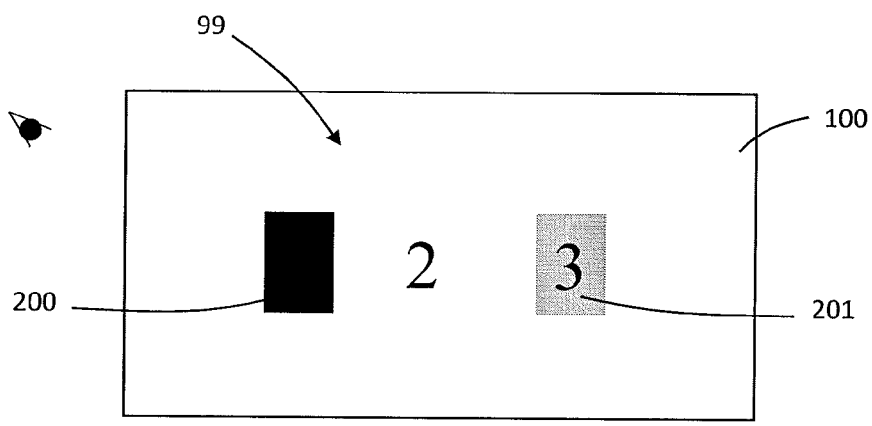
Figure 4B:
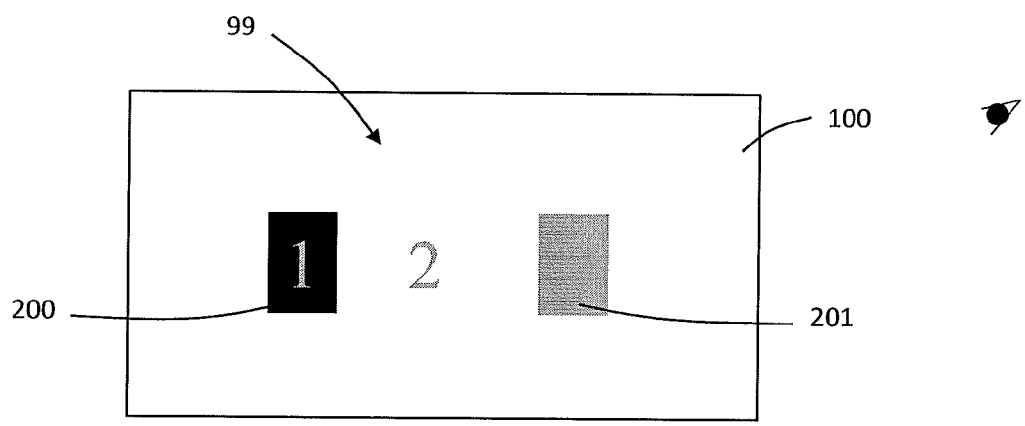

FIGS. 4A-B are schematic views of a colour shifting marking provided on a wrapper that has adjacent; e.g., surrounding, regions that blend with the colour of the marking depending on the viewing angle.

The schematic drawings presented herein are not necessarily to scale, but are shown merely for purposes of illustration.

Figure 1:
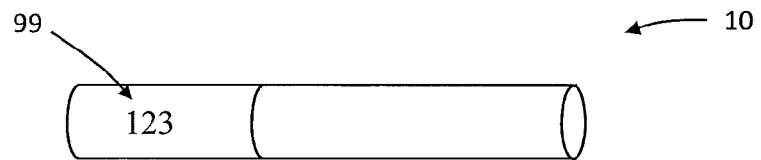
FIG. 1 is a schematic perspective view of an embodiment of a smoking article having a colour shifting marking.

Referring now to FIG. 1, a smoking article 10 is depicted. The smoking has a colour shifting marking 99 that is visible to a consumer. As indicated above, the marking may be provided on or in the article 10 or component thereof over an entire visible surface or a portion of the surface, as depicted. In FIG. 1, the marking 99 is depicted as three numbers, "123." The three numbers may be considered as a single marking or as three different markings.

Figure 2:
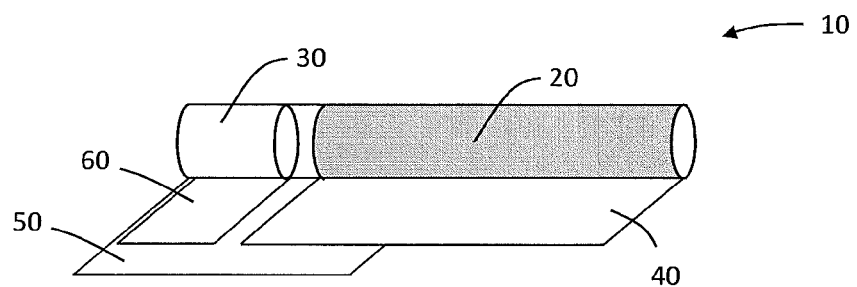
FIG. 2 is a schematic perspective view of a smoking article having wrappers on which a colour shifting marking may be provided.

Referring now to FIG. 2, a partial unrolled smoking article 10, in this case a cigarette, is depicted. The smoking article 10 includes a tobacco rod 20 and a mouth end filter 30. While depicted as being separated by a gap, the tobacco rod 20 and filter 30 may abut one another. The smoking article 10, includes a plug wrap 60 that circumscribes at least a portion of the filter 30 and cigarette paper 40 that circumscribes at least a portion of the tobacco rod 20. Tipping paper 50 or other suitable wrapper circumscribes the plug wrap 60 and cigarette paper 40 as is generally known in the art. The colour shifting marking, such as marking 99 depicted in FIG. 1, may be provided on the plug wrap 60, the cigarette paper 40, or the tipping paper 50. If the marking is provided on the plug wrap 60 or the cigarette paper 40 at a location that is covered by the tipping paper 50, at least a portion of the tipping paper is transparent to allow the marking to be visible to a consumer. Preferably, the marking is provided on a portion of the smoking article 10 that is not combusted during use, such as on the plug wrap 60 or a portion of the tipping paper 50 that overlies the filter 30.

While the smoking article depicted in FIG. 2 is a cigarette and wrappers 40, 50, 60 are cigarette paper, tipping paper and plug wrap, it will be understood that other smoking articles may have similar wrappers, components or surfaces on or in which a colour shifting marking may be provided.

Referring now to FIGS. 3A-B, a wrapper 100, which may be a plug wrap, tipping paper, cigarette paper or the like, is shown. A colour shifting marking 99 is provided on the wrapper 100. When viewed from a first angle (FIG. 3A), the colour shifting marking 99 is a first colour. When viewed from a second angle (FIG. 3B), the colour shifting marking 99 is a second colour. The marking 99 may shift through a number of different colours when viewed from a number of different angles between the first angle and the second angle or may smoothly transition from the first colour to the second colour as the viewing angle is shifted from the first angle to the second angle.

Referring now to FIGS. 4A-B, a wrapper 100 having a colour shifting marking 99 is shown. The wrapper also includes regions 200, 201 that are adjacent to; e.g. that surround, at least a portion of the marking 99. The depicted adjacent regions 200, 201 are of different colours. The first adjacent region 200 is of a colour that is the same or essentially the same as the marking 99 when viewed from a first angle (FIG. 4A). The second adjacent region 201 is of a colour that is the same or essentially the same as the marking 99 when viewed from a second angle (FIG. 4B). Accordingly, when viewed from the first angle, the portion of the marking 99 that is adjacent to the first adjacent region 200 is hidden, and when viewed from the second angle, the portion of the marking 99 that is adjacent to the second adjacent region 201 is hidden.

The invention claimed is:

1. A smoking article comprising:
   a colour shifting marking that comprises a first colour shifting pigment, wherein the first colour shifting pigment produces a first colour when viewed from a first angle and produces a second colour when viewed from a second angle; and
   a first region adjacent at least a portion of the colour shifting marking, wherein the first adjacent region is coloured such that the first colour of the first colour shifting pigment blends with the colour of the first adjacent region when viewed from the first angle,
   wherein the colour shifting marking is provided on a layer underneath a transparent component of the smoking article or on an inner surface of the transparent component.

2. A smoking article according to claim 1, wherein the colour produced by the first colour shifting pigment transitions from the first colour to the second colour as the viewing angle changes from the first angle to the second angle.

3. A smoking article according to claim 1, wherein the first adjacent region is a first primary colour and the first colour of the first colour shifting pigment is a second primary colour.

4. A smoking article according to claim 1, further comprising a second region adjacent at least a portion of the colour shifting marking.

5. A smoking article according to claim 4, wherein the second adjacent region is coloured such that the second colour of the first colour shifting pigment blends with the colour of the second adjacent region when viewed from the second angle.

6. A smoking article according to claim 4, wherein the second adjacent region is coloured the same colour as the second colour of the first colour shifting pigment.

7. A smoking article according to claim 1, wherein the first colour shifting pigment comprises a first goniochromatic pigment.

8. A smoking article according to claim 1, wherein the colour shifting marking comprises a first portion having the first colour shifting pigment, and a second portion having a second colour shifting pigment, the second colour shifting pigment producing a colour different from the first colour of the first colour shifting pigment when viewed from the first angle.

9. A smoking article according to claim 1, wherein the smoking article comprises a wrapper and wherein the colour shifting marking is provided on or in the wrapper.

10. A smoking article according to claim 9, wherein the wrapper forms a curved surface of the smoking article.

11. A smoking article according to claim 1, comprising:
a filter portion wrapped by a filter plug wrapper;
a rod of smokable material wrapped by a smokable material wrapper; and
a tipping wrapper surrounding at least a portion of the filter portion and at least a portion of the rod of smokable material,
wherein the colour shifting marking is provided on the filter plug wrapper, the smokable material wrapper or the tipping wrapper such that the colour shifting marking is provided underneath a transparent component of the smoking article or on an inner surface of the transparent component.

* * * * *